(12) United States Patent
Balasubramaniyan et al.

(10) Patent No.: US 7,779,471 B2
(45) Date of Patent: Aug. 17, 2010

(54) METHOD AND SYSTEM FOR PREVENTING DOS ATTACKS

(75) Inventors: Jai Balasubramaniyan, Kanata (CA); Kuntal Daftary, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1162 days.

(21) Appl. No.: 11/099,819

(22) Filed: Apr. 5, 2005

(65) Prior Publication Data

US 2006/0225133 A1    Oct. 5, 2006

(51) Int. Cl.
*G06F 11/00* (2006.01)
(52) U.S. Cl. .......................... 726/23; 726/22
(58) Field of Classification Search ............... 726/22–23
See application file for complete search history.

(56) References Cited

U.S. PATENT DOCUMENTS 6,742,123 B1    5/2004   Foote
6,789,203 B1    9/2004   Belissent

OTHER PUBLICATIONS http://www.ciscopress.com/articles/article.asp?p=345618 &segNum=4; Cisco Router Firewall Security: DoS Protection;By Richard A Deal.Sample Chapter is provided courtesy of Cisco Press. Date: Oct. 22, 2004.The book is published on Aug. 2004; Retrieved date Sep. 10, 2008.*
http://packetstormsecurity.org/defcon10/MoreInfo/ CiscoIOSFirewallFeatureSetFrequentlyAskedQuestions.pdf; Cisco: Cisco IOS Firewall Feature Set Frequently asked questions; published on 2002.; Retrieved date Sep. 10, 2008.*
https://www2.sans.org/reading_room/whitepapers/firewalls/806. php; CBAC-Cisco IOS Firewall Features Set Foundations by Evan Davies GIAC Security Essentials Assignment Ver. 1.3; Publised on 2002; Retrieved date Sep. 10, 2008.*

* cited by examiner

*Primary Examiner*—Jung Kim
*Assistant Examiner*—Samson B Lemma
(74) *Attorney, Agent, or Firm*—Trellis IP Law Group, PC

(57) ABSTRACT

A method, system and apparatus for preventing Denial of Service (DOS) attacks on a device are provided. The method includes determining that the device is receiving DOS attack vectors. The method further includes identifying the attack vector with the highest idle time and removing the identified attack vector. Further, the method includes repeating identifying and removing the identified attack vector until the number of attack vectors falls below a threshold value.

17 Claims, 6 Drawing Sheets

METHOD AND SYSTEM FOR PREVENTING DOS ATTACKS

BACKGROUND OF THE INVENTION

1. Field of Invention

The embodiments of the invention relate in general to attacks in networking devices. More specifically, the embodiments of the invention relate to methods and systems for preventing Denial of Service (DOS) attacks in the networking devices.

2. Description of the Background Art

In the age of the Internet, one of the major problems in a computer network is security. Various attackers breach the security of computer networks by attacking the computer network. The attacks can either be through unauthorized access to the network, or by restricting the access of authorized users to the network. Denial of Service (DOS) attack is one such attack, which denies the network access to authorized users.

A DOS attack can be defined as a way of attacking a networking device by sending a high volume of requests over the computer network. A high volume of requests can slow down the performance of a networking device, so that it is unavailable for the users. An example of the networking device is a router. The attack is initiated by sending a request from an attacker to at least one of the computers in the computer network. The process of sending the request from the computer is termed as half-open session. The session is considered as established if the networking device detects a returning request from the computer.

Networking device allocates a finite amount of resources to establish half-open sessions. These resources include memory and a CPU processor. During DOS attack conditions, the attacker starts sending a high volume of requests (attack vectors) to the computer. However, the computer may not respond to these attack vectors. Consequently, a large number of half-open sessions are created. There is an idle timeout associated with each half-open session. Idle timeout is defined as the amount of time the networking device waits for the returning request before terminating the half-open sessions. However, the attacker sends the attack vectors at a rate that is faster than the rate at which the networking device can terminate them. In such situations, all the resources allocated for creating half-open sessions are consumed and any further connections with other clients are restricted. Hence, the networking device is no longer available for other clients.

Conventional approaches to prevention of DOS attacks include the use of a firewall to block requests from a potential attacker. The potential attacker is identified by monitoring the number of requests from a particular location. If the number of requests exceeds a threshold limit, the location is considered to be a potential attacker. Hence, any further requests coming from the location are blocked.

However, this approach has a few limitations. The potential attacker can continuously change its location. Hence, the identification and blocking has to be carried out each time the attacker changes its location. Further, in some situations, an authorized user may send a high volume of requests at a particular time. Therefore, according to the conventional approach, the authorized user may also get blocked.

DETAILED DESCRIPTION OF EMBODIMENTS OF THE INVENTION

The invention provides a method, system, apparatus and machine-readable medium for preventing Denial of Service (DOS) attacks on a networking device. An example of the networking device is a router. The router connects two or more networking clients in a computer network. A DOS attack can be defined as a method of attacking a networking device by sending a high volume of requests over the network. A high volume of requests slows down the performance of a device, so that the network device is unavailable for networking clients. Such high volumes of requests are termed as attack vectors. The invention provides a method and system to remove the attack vectors from the network. The invention further provides a method for expediting the removal of the attack vectors. In accordance with one embodiment of the invention, the method can be implemented in a firewall of the computer network.

Figure 1:
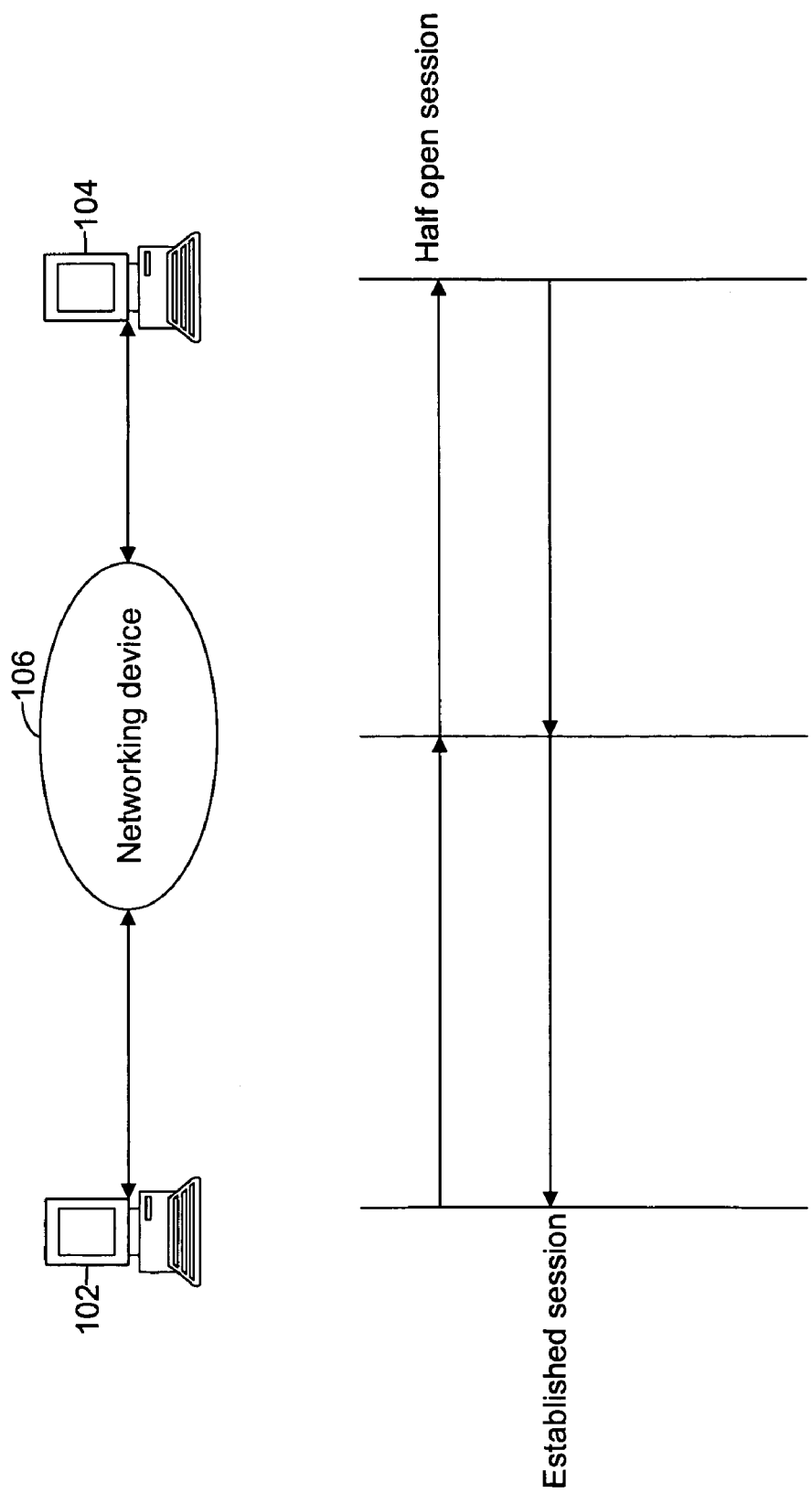
FIG. 1 illustrates an environment wherein the invention can be practiced, in accordance with an exemplary embodiment of the invention.

FIG. 1 illustrates an environment wherein the invention can be practiced, in accordance with an exemplary embodiment of the invention. The environment includes a plurality of clients, for example, clients 102 and 104, and a networking device 106. Client 102 and client 104 are connected to each other through networking device 106. In normal processing, client 102 sends a request to client 104 through networking device 106. The process of sending the request from client 102 to client 104 is termed as a half-open session. The session is considered as established if a returning request from client 104 to client 102 is detected by networking device 106. The session can be based on protocols, for example, Transmission Control Protocol (TCP) and User Datagram Protocol (UDP). A TCP session is considered as established when a three-way handshake between client 102, client 104 and networking device 106 is completed. Client 102 initiates a TCP connection by sending a SYN request to networking device 106. Networking device 106 sends a SYN_ACK to client 104. The SYN_ACK is sent to receive an acknowledgement from client 104. Thereafter, client 104 sends back an ACK to networking device 106, which is also transmitted to client 102. This whole process is known as a three-way handshake.

Networking device 106 allocates a finite amount of resources to establish the half-open sessions. The resources include memory and a CPU processor. During DOS attack conditions, client 102 starts sending a high volume of requests (attack vectors) to client 104. However, client 104 does not respond to these attack vectors. Hence, a large number of half-open sessions are created. Networking device 106, after waiting for a period of time that is equal to idle timeout, terminates the half-open sessions. However, if the idle timeout is large, the half-open sessions remain active for a longer period of time. In such situations, all the resources allocated for creating the half-open sessions are consumed and any further connections with other clients can get restricted. Consequently, networking device 106 no longer remains available to other clients. The various embodiments of the invention overcome this problem by removing the attack vectors expeditiously, thereby preventing a DOS attack.

Figure 2:
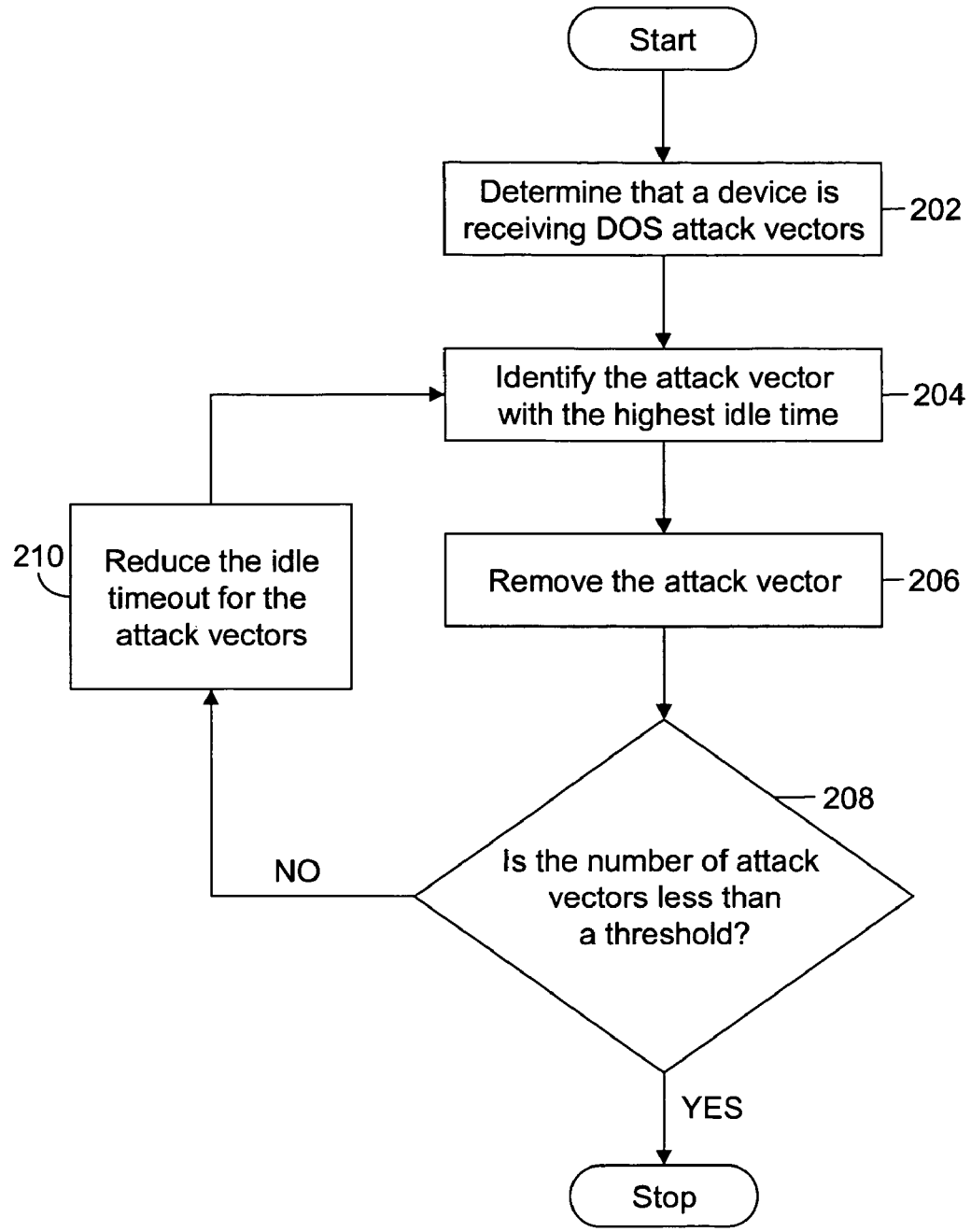
FIG. 2 illustrates a flowchart of a method for preventing Denial of Service (DOS) attacks on a networking device, in accordance with an exemplary embodiment of the invention.

FIG. 2 illustrates a flowchart of a method for preventing DOS attacks on networking device 106, in accordance with an embodiment of the invention. At step 202, networking device 106 is monitored to determine whether networking device 106 is receiving attack vectors. This determination is based on the number of half-open sessions. If the number of half-open sessions is greater than a high-threshold value, networking device 106 is considered to be receiving attack vectors. At step 204, the attack vector with the highest idle time is identified. The attack vector with the highest idle time is the oldest existing attack vector. The oldest attack vector is the half-open session, which has not seen any traffic for the greatest amount of time. Thereafter, the identified attack vector is removed at step 206. The attack vector is removed by terminating the half-open session being used by the identified attack vector. Further, at step 208, networking device 106 is checked for the number of half-open sessions remaining in networking device 106. If the number of half-open sessions is not less than a low-threshold value, step 210 is performed. The high-threshold value and low-threshold value in accordance with various embodiments of the invention are discussed in conjunction with FIG. 3. At step 210, the idle timeout is reduced. The idle timeout is the period of time networking device 106 waits before terminating the half-open session. The idle timeout is reduced to expedite the removal of attack vectors. In accordance with various embodiments of the invention, the idle timeout is reduced by a factor of two. Thereafter, step 204 to step 208 are repeated until the number of attack vectors falls below the low-threshold value. In an embodiment of the invention, the idle timeout value is increased once the number of attack vectors falls below the low-threshold value. In another embodiment of the invention, a decision regarding the removal of attack vectors is made only on the high-threshold value. Attack vectors are removed if the number of attack vectors is greater than the high-threshold value; otherwise the session follows normal firewall processes.

Figure 3:
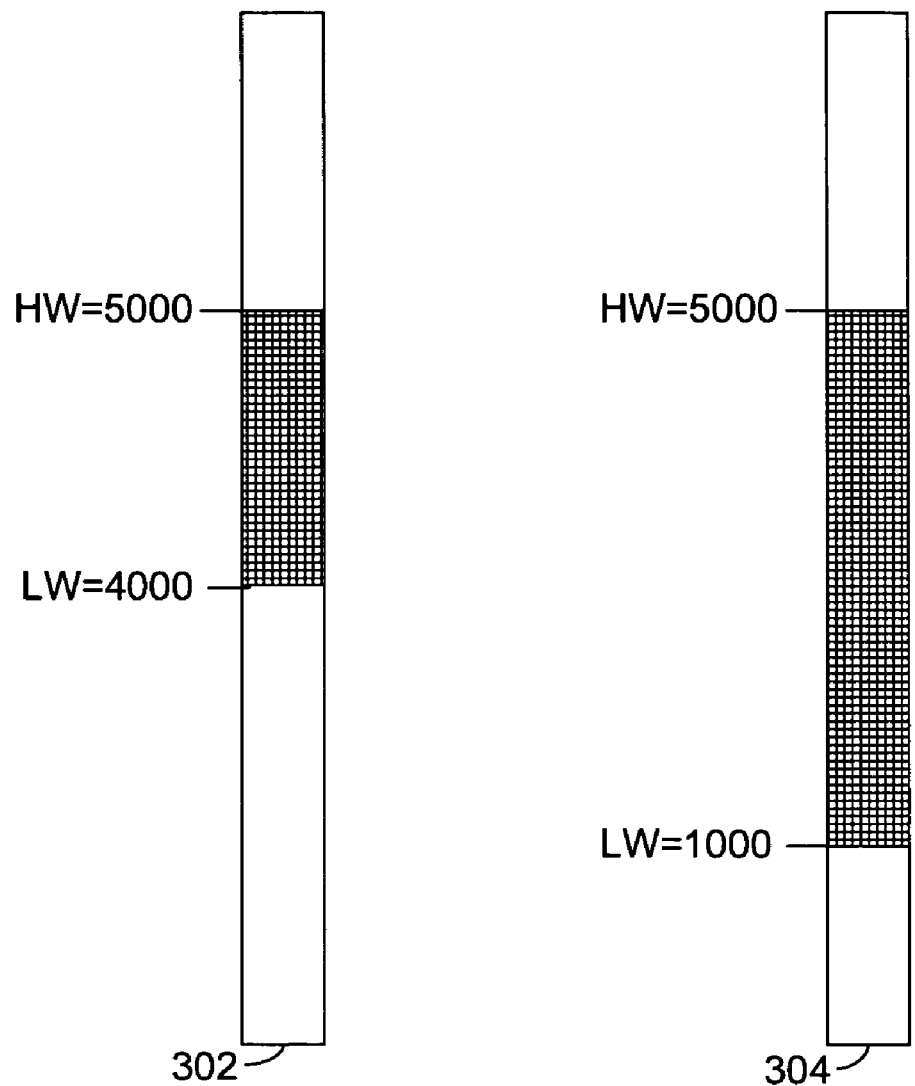
FIG. 3 illustrates low-threshold values and high-threshold values, in accordance with various embodiments of the invention.

FIG. 3 illustrates the low-threshold value and the high-threshold value, in accordance with various embodiments of the invention. The low-threshold value is termed as Low Watermark (LW) and the high-threshold value is termed as High Watermark (HW). HW is the number of half-open sessions at which networking device 106 starts removing the attack vectors. LW is the number of half-open sessions at which networking device 106 stops removing the attack vectors.

A column 302 shows that HW is equal to 5000 and LW is equal to 4000. A small difference between HW and LW indicates that networking device 106 is not subjected to sudden bursts of requests. The removal of the attack vectors starts when the number of attack vectors exceeds HW, and the removal process is stopped when the number of attack vectors falls below LW.

A column 304 shows that HW is equal to 5000 and LW is equal to 1000. This type of setting is used when the removal of attack vectors needs to be aggressive. The removal starts when the number of attack vectors exceeds HW, and continues until the number falls below LW (i.e., 1000). The values of HW and LW depicted are exemplary and used only for the purpose of illustration. The values of HW and LW are determined based on the requirements of specific network. A small difference in HW and LW is maintained in computer networks, where the flow of traffic is high under normal circumstances. The more aggressive removal system is used where the flow of traffic under normal circumstances is not too high.

Figure 4:
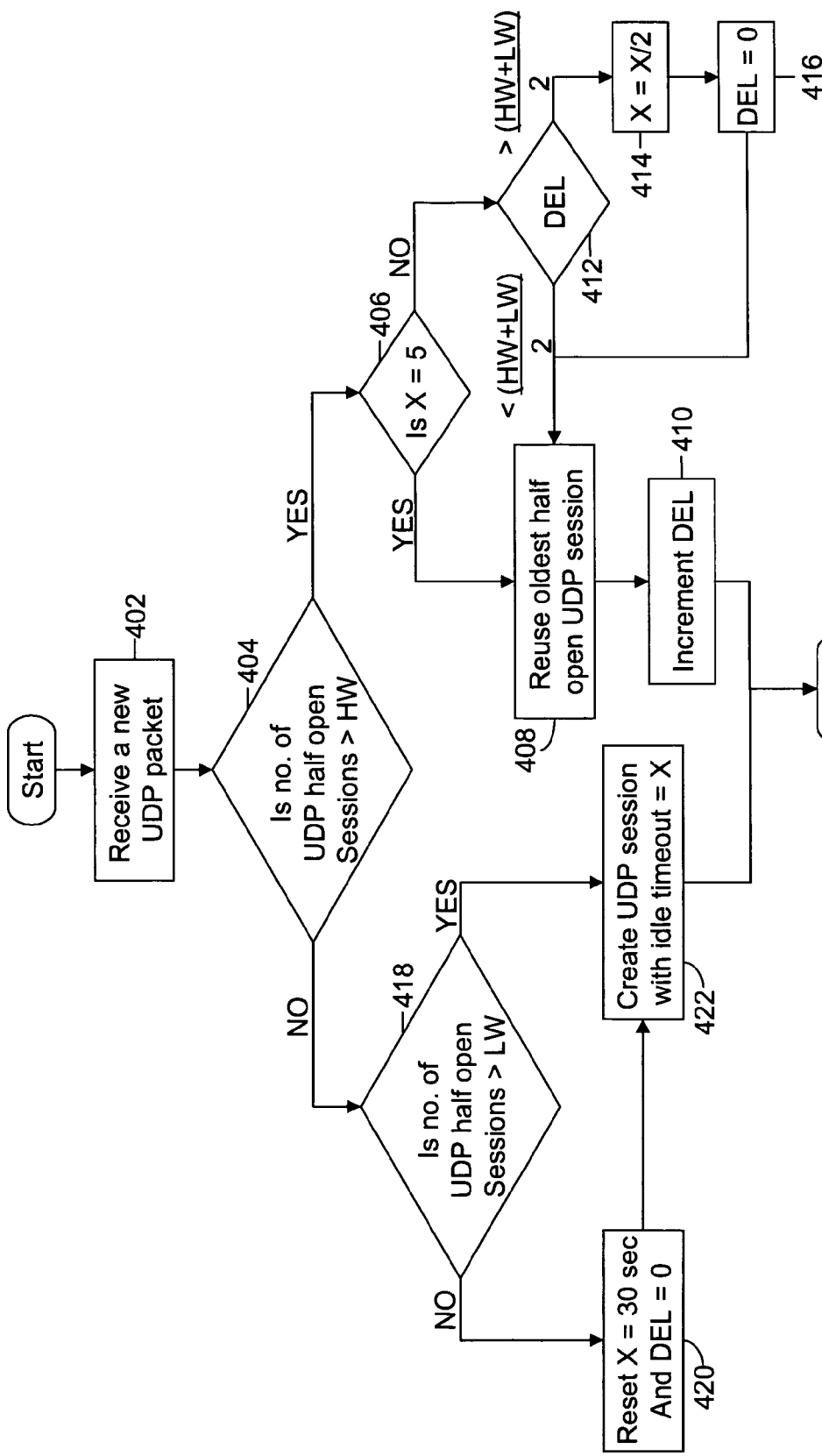
FIG. 4 illustrates a flowchart of a method for preventing DOS attack in a User Datagram Protocol (UDP) session, in accordance with an exemplary embodiment of the invention.

FIG. 4 illustrates a flowchart of a method for preventing a DOS attack in a UDP session, in accordance with an embodiment of the invention. For the purpose of illustration, the initial value of the idle timeout (X) can be set at 30 seconds. The initial value of the delete count (DEL) is zero. DEL is the number of half-open sessions at idle timeout X that have been terminated. At step 402, a new UDP packet is received by networking device 106. This new UDP packet is used to create a new UDP half-open session. The UDP half-open session is the UDP session that has seen traffic in only one direction. At step 404, total number of UDP half-open sessions is counted. If the number of UDP half-open sessions is more than HW, step 406 is executed. The number of sessions being more than HW implies that networking device 106 is under a DOS attack. At step 406, the current value of X is checked. In various embodiments of the invention, a maximum value of X and a minimum value of X characterize a network session. In accordance with an embodiment of the invention, the minimum value of X can be five seconds. If the current value of X is five seconds, step 408 is performed. At step 408, the oldest existing half-open session is reused for the new half-open session. The oldest UDP half-open session is the UDP unidirectional session, which has not seen any traffic for the greatest amount of time. The reuse of the oldest UDP half-open session implies that the resources (memory) allocated to the oldest half-open session, have now been allocated to the new half-open session. Since the oldest half-open session has been terminated, therefore the delete count, DEL is incremented at step 410. Further, the normal firewall processing is performed.

Referring to step 406, if the current value of X is not equal to five seconds, i.e., X is greater than five seconds, then step 412 is performed. At step 412, DEL is checked. If DEL is less than the arithmetic average of HW and LW, i.e., (HW+LW)/2, step 408 and step 410 are performed. If the DEL is more than the arithmetic average of HW and LW, the idle timeout, X, is reduced at step 414. In accordance with various embodiments of the invention, X can be reduced by a factor of two. Hence, in an embodiment of the invention, under continuous DOS attacks, X is reduced from 30 seconds to 15 seconds, then to seven seconds and finally to five seconds. Thereafter, at step 416, the DEL is reset to the initial value of zero. Further, steps 408 and 410 are performed. In this way, the process is repeated till the number of attack vectors falls below LW.

Referring to step 404, if the number of UDP half-open sessions is not more than HW, step 418 is performed. At step 418, the number of UDP half-open sessions is again counted. If the number is not more than LW, step 420 is performed. A number that is less than LW implies that either there is no DOS attack or the attack vectors have been removed. Hence, at step 420, the idle timeout, X, is reset to its initial value of 30 seconds. The delete count, DEL, is also reset to the initial value of zero. Thereafter, at step 422, the UDP session is created with idle timeout, X=30 seconds, and normal firewall processing is performed.

Referring to step 418, if the number of UDP half-open sessions is more than LW, step 422 is performed. At step 422, the UDP session is created with idle timeout, X, and normal firewall processing is performed. The value of X is not reset to the initial value of 30 seconds. The UDP session is created with the current value of X.

Thus, by practice of various embodiments of the invention, once the cost of deletion and creation of a packet is solved by homogenization of UDP session structure and reuse, the right candidate UDP session for deletion is to be selected. The most suspicious UDP session is sought without penalizing legitimate UDP sessions. For various embodiments of the invention, the heuristics in order of priority may be recommended as follows: (i) exclusion of child session; (ii) unidirectional UDP sessions; (iii) exclusion of UDP sessions with large packet count; (iv) picking the most idle session; and (v) exponential reduction of session idle timeouts for UDP sessions. With respect to "exclusion of a child session," in various embodiments of the invention, a TFTP data session with a parent TFTP control session would not be a candidate for deletion even if it has been idle for a while, because sufficient negotiation has gone on in establishing the parent control session between the client and server to increase a confidence level for this type of session. "Unidirectional UDP sessions" are more suspect than bidirectional sessions, because traffic having flown both ways (i.e., bidirectional) is an indication that the responder has acknowledged the connection and the connection is more legitimate than a unidirectional UDP session. With respect to "exclusion of UDP sessions with large packet count," because packet count for UDP sessions is a reliable indicator for the legitimacy of a session, a session that has seen massive amounts of data transfer (e.g., such as a voice call) but has been idle for a while should be excluded or not be considered for deletion, whereas idle sessions with very small packet counts are more suspicious. Addressing now "picking the most idle session," idle timers for all UDP sessions may be maintained, and sessions that have not seen any traffic for the longest duration after having satisfied criterion "(i) exclusion of child session," "(ii) unidirectional UDP sessions," and "(iii) exclusion of UDP sessions with large packet count" may be the right candidates for deletion. With respect to "exponential reduction of session idle timeouts for UDP sessions," and as previously explained above in referencing FIG. 4, the idea is to aggressively reduce the idle threshold for UDP sessions so that when a DOS attack is detected, new sessions created by the firewall have a much lower tolerance level; thus, we exponentially reduce the idle timeout of new incoming sessions may be exponentially reduced with the anticipation that the low timeouts of these sessions result in quicker deletion of suspicious sessions.

Figure 5:
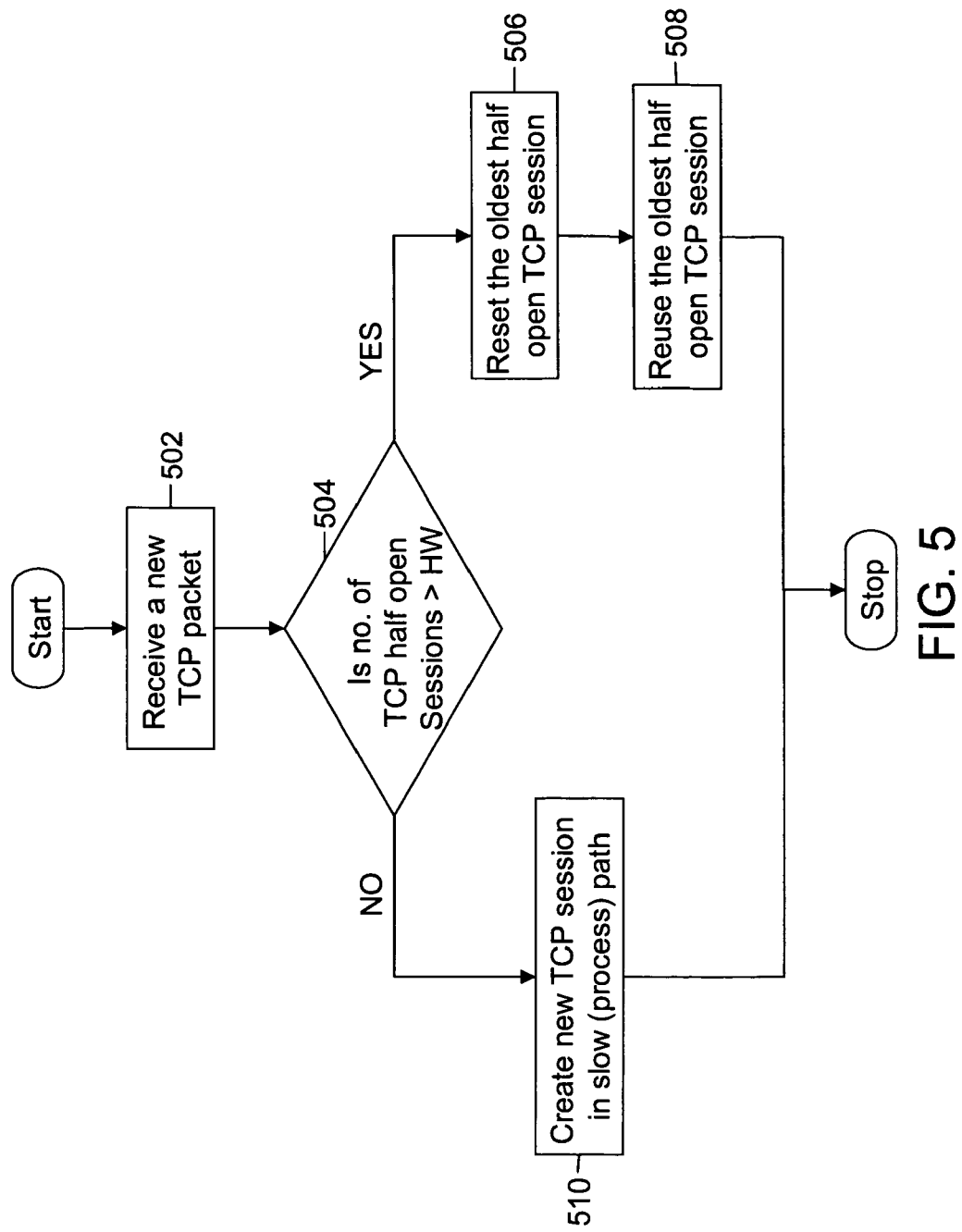
FIG. 5 illustrates a flowchart of a method for preventing DOS attack in a Transmission Control Protocol (TCP) session, in accordance with an exemplary embodiment of the invention.

FIG. 5 illustrates a flowchart of a method for preventing a DOS attack in a Transmission Control Protocol (TCP) session, in accordance with an embodiment of the invention. At step 502, a new TCP packet is received by networking device 106. This TCP packet is used to create a new TCP half-open session. The TCP half-open session is a session that has not completed the three-way handshake (SYN, SYN_ACK and ACK). At step 504, the number of TCP half-open sessions is counted. If the number of TCP half-open sessions is more than HW, i.e., networking device 106 is under a DOS attack, step 506 is performed. At step 506, the oldest TCP half-open session is reset. This reset is based on the creation time of the TCP session. Thereafter, at step 508, the oldest TCP half-open session is reused by the new TCP half-open session. This is done to continuously reuse the oldest half-open sessions, to ensure that the number of half-open sessions does not exceed HW. Thereafter, normal firewall processing is performed Referring to step 504, if the number of TCP half-open sessions is not more than HW, step 510 is performed. At step 510, the new TCP session is created in the slow path, i.e., the idle timeout for the session is the maximum idle timeout, for example, 30 seconds.

Figure 6:
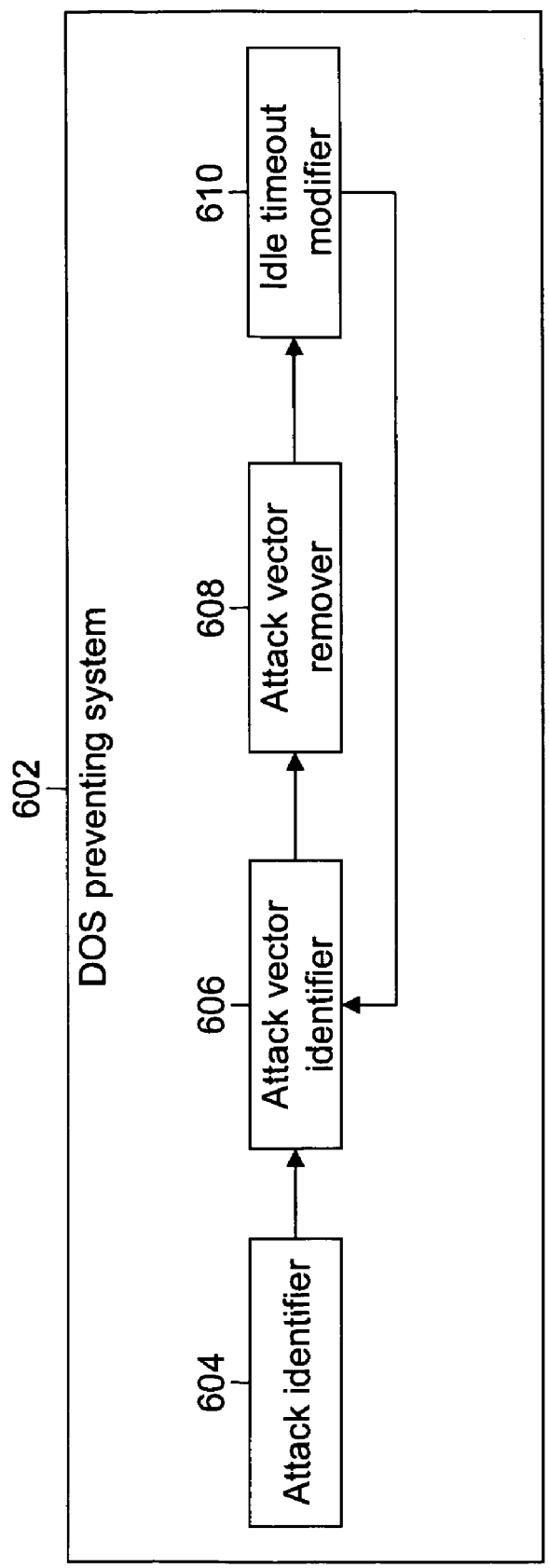
FIG. 6 is a block diagram of a DOS prevention system, in accordance with an exemplary embodiment of the invention.

FIG. 6 is a block diagram of a DOS preventing system 602, in accordance with an exemplary embodiment of the invention. DOS preventing system 602 includes an attack identifier 604, an attack vector identifier 606, an attack vector remover 608, and an idle timeout modifier 610. Attack identifier 604 determines whether networking device 106 is under a DOS attack. This determination is based on the value of HW. Thereafter, attack vector identifier 606 identifies the attack vector with highest idle time. Attack vector remover 608 then removes the identified attack vector. This is done to utilize the resources that were being used by the oldest attack vector for a new attack vector. Further, idle timeout modifier 610 reduces the idle timeout, and the process of identification and removal of attack vectors is repeated. Once the number of attack vectors falls below a threshold value, for example, a low-threshold value in the case of UDP transmission, idle timeout modifier 610 increases the idle timeout. Interconnection between the various system elements depends on the method described, by means of FIG. 2, FIG. 4 and FIG. 5. In various embodiments of the invention, the system elements of DOS preventing system 602 are implemented in the form of software modules. In an embodiment of the invention, DOS preventing system 602 can reside in the firewall of the router.

Embodiments of the present invention have the advantage that the method can be used for preventing DOS attacks in systems based on transmission protocols such as UDP and TCP session protocols. Further, the method expedites the removal of attack vectors. The invention provides an aggressive and relatively calmer method of removing attack vectors. The various embodiments of the invention enable the setting up of low and high thresholds, based on the needs of specific networks. Further, the method does not require blocking clients to prevent DOS attacks.

Although the invention has been discussed with respect to specific embodiments thereof, these embodiments are merely illustrative, and not restrictive, of the invention. For example, a 'method for preventing DOS attacks on a device' can include any type of analysis, manual or automatic, to anticipate the needs of the method.

Although specific protocols have been used to describe embodiments, other embodiments can use other transmission protocols or standards. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention.

One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A computer implemented method comprising: a processor for preventing Denial of Service (DOS) attacks on a device, the method comprising the steps of:
    (a) determining, by the processor, that the device is receiving DOS attack vectors;
    (b) identifying with an attack vector identifier the attack vector with the highest idle time;
    (c) removing the identified attack vector with an attack vector remover;
    (d) determining if the remaining number of attack vectors is less than a threshold value;
    (e) reducing with a timeout modifier the idle timeout for the remaining attack vectors if the number of remaining attack vectors is not less than the threshold value; and
    (f) repeating steps (b) through (e) until the number of attack vectors is less than the threshold value.

2. The computer implemented method of claim 1 additionally comprising increasing with an idle time modifier the idle timeout after the number of attack vectors is less than the threshold value.

3. The computer implemented method of claim 1 additionally comprising reusing the memory in the device occupied by the identified attack vector for another attack vector.

4. The computer implemented method of claim 1 wherein the DOS attack is prevented for User Datagram Protocol (UDP) sessions.

5. The computer implemented method of claim 1 wherein the DOS attack is prevented for Transmission Control Protocol (TCP) sessions.

6. The computer implemented method of claim 1 additionally comprising distinguishing between attack vectors and regular traffic.

7. A system for preventing Denial of Service (DOS) attacks on a device, comprising
- a computer processor;
- an attack vector determiner for determining that the device is receiving DOS attack vectors;
- an attack vector identifier for identifying the attack vector with the highest idle time; and
- an attack vector remover for removing the identified attack vector;
- an attack vector determiner for determining if the remaining number of attack vectors is less than a threshold value;
- an attack vector reducer for reducing the idle timeout for the remaining attack vectors if the number of remaining attack vectors is not less than the threshold value; and
- an attack vector repeater and identifier and remover and determiner and reducer for identifying the attack vector with the highest idle time, removing the identified attack vector, determining if the remaining number of attack vectors is less than a threshold value, reducing the idle timeout for the remaining attack vectors if the number of remaining attack vectors is not less than the threshold value, until the number of attack vectors is less than the threshold value.

8. The system of claim 7 wherein the DOS attack is prevented for User Datagram Protocol (UDP) sessions.

9. The system of claim 7 wherein the DOS attack is prevented for Transmission Control Protocol (TCP) sessions.

10. An apparatus for preventing Denial of Service (DOS) attacks on a device, comprising
- a computer processor; and
- a processor-readable storage medium including instructions executable by the processor, said instructions comprising one or more instructions for performing the steps of:
  - (a) determining that the device is receiving DOS attack vectors;
  - (b) identifying with an attack vector identifier the attack vector with the highest idle time;
  - (c) removing the identified attack vector with an attack vector remover;
  - (d) determining if the remaining number of attack vectors is less than a threshold value;
  - (e) reducing with a timeout modifier the idle timeout for the remaining attack vectors if the number of remaining attack vectors is not less than the threshold value; and
  - (f) repeating steps (b) through (e) until the number of attack vectors is less than the threshold value.

11. A non-transitory processor-readable storage medium including instructions executable by one or more computer processors for preventing Denial of Service (DOS) attacks on a device, said executable instructions comprising one or more instructions for performing the steps of:
- (a) determining that the device is receiving DOS attack vectors;
- (b) identifying with an the attack vector identifier the attack vector with the highest idle time;
- (c) removing the identified attack vector with an attack vector remover;
- (d) determining if the remaining number of attack vectors is less than a threshold value;
- (e) reducing with a timeout modifier the idle timeout for the remaining attack vectors if the number of remaining attack vectors is not less than the threshold value; and
- (f) repeating steps (b) through (e) until the number of attack vectors is less than the threshold value.

12. The non-transitory processor-readable storage medium of claim 11 additionally comprising one or more instructions for identifying that a session is not an attack session.

13. The non-transitory processor-readable storage medium of claim 12 additionally comprising one or more instructions for eliminating from removal consideration any session that are child sessions.

14. The computer implemented method of claim 1 additionally comprising expediting the removal of attacked vectors with the timeout modifier.

15. A computer implemented method comprising: a processor for preventing Denial of Service (DOS) attacks on a device, the method comprising the steps of:
- (a) determining, by the processor, that the device is receiving DOS attack vectors;
- (b) identifying with an attack vector identifier the attack vector with the highest idle time;
- (c) removing the identified attack vector with an attack vector remover;
- (d) reusing the memory in the device occupied by the identified attack vector for another attack vector;
- (e) expediting the removal of attack vectors with the attack vector remover; and
- (f) determining if the remaining number of attack vectors is less than a threshold value;
- (g) reducing with a timeout modifier the idle timeout for the remaining attack vectors if the number of remaining attack vectors is not less than the threshold value; and
- (h) repeating steps (a) through (g) until the number of attack vectors falls below a threshold value.

16. The computer implemented method of claim 15 additionally comprising distinguishing between attack vectors and regular traffic.

17. The non-transitory processor-readable storage medium of claim 11 wherein said executable instructions additionally comprise:
- one or more instructions for reusing the memory in the device occupied by the identified attack vector for another attack vector;
- one or more instructions for expediting the removal of attack vectors with the attack vector remover.

* * * * *